(12) United States Patent
Steffan et al.

(10) Patent No.: US 8,655,504 B2
(45) Date of Patent: Feb. 18, 2014

(54) SAFETY TEST CARRIER CONTROLLED BY EXTERNAL GUIDANCE SYSTEM

(76) Inventors: Hermann Steffan, Linz (AT); Andreas Moser, Linz (AT); Saeed Al-Ghaamdi Ali, Riyadh (SA); Florian Nyvelt, Linz (AT)

( * ) Notice: Subject to any disclaimer, the term of this patent is extended or adjusted under 35 U.S.C. 154(b) by 52 days.

(21) Appl. No.: 12/768,964

(22) Filed: Apr. 28, 2010

(65) Prior Publication Data

US 2011/0270467 A1    Nov. 3, 2011

(51) Int. Cl.
*B60W 10/08* (2006.01)
(52) U.S. Cl.
USPC .......................................... 701/2; 342/357.25
(58) Field of Classification Search
USPC ........... 701/2, 1, 301; 73/12.04, 12.01, 12.11, 73/856, 865.3; 703/7, 8; 342/357.25
See application file for complete search history.

(56) References Cited

U.S. PATENT DOCUMENTS

| | | | | |
|---|---|---|---|---|
| 5,338,206 | A * | 8/1994 | Hupfer ........................ | 434/305 |
| 7,103,704 | B2 * | 9/2006 | Chatterjee .................... | 710/315 |
| 7,575,491 | B1 * | 8/2009 | Martin ............................ | 440/87 |
| 7,617,048 | B2 * | 11/2009 | Simon et al. .................. | 701/301 |
| 2010/0109835 | A1 * | 5/2010 | Alrabady et al. .............. | 340/5.2 |

OTHER PUBLICATIONS

John W. Zellner et al., Extension of the Honda-DRI "Safety Impact Methodology"(SIM) for the NHTSA Advanced Crash Avoidance Technology (ACAT) Program and Application to a Prototype Advanced Collision Mitigation Braking System, Apr. 20, 2009, SAE World Congress & Exhibition, Paper No. 2009-01-0781, pp. 1-21.*

* cited by examiner

*Primary Examiner* — Marthe Marc-Coleman
(74) *Attorney, Agent, or Firm* — McCarter & English, LLP

(57) ABSTRACT

The disclosure relates to a carrier for automotive safety testing wherein the movement of the carrier is controlled by an external guidance system, so that the carrier follows a determined route during the automotive safety testing. The actual position of the carrier is typically determined by a GPS system, while the desired position and velocity of the carrier are provided by a wireless transmitter, typically a W-LAN router receiving data from a PC or similar external source.

7 Claims, 1 Drawing Sheet

SAFETY TEST CARRIER CONTROLLED BY EXTERNAL GUIDANCE SYSTEM

BACKGROUND OF THE INVENTION

1. Field of the Disclosure

The present disclosure relates to active and passive safety testing for automotive vehicles. More particularly, the present disclosure relates to moving obstacles which can be guided along a determined route by an external guidance system prior to being impacted or bypassed by the test vehicles during the safety testing.

2. Description of the Prior Art

In the prior art of safety testing for automotive vehicles, it is known to provide obstacles (sometimes called "dummies") which are impacted by the testing vehicle. However, in the prior art, these obstacles are typically stationary, or are otherwise statically placed, such as flat on the floor with the ability to rise or otherwise to extend thereby forming an obstacle when the test vehicle approaches.

Moving obstacles have been provided by attaching them directly onto a secondary vehicle which is driven by a human driver. Similarly, obstacles have been towed by a secondary vehicle driven by a human driver. Similarly, obstacles have been mounted on a radio or cable-controlled carrier wherein the movement of the obstacles is remote-controlled by a human operator. In all cases, the route of the obstacle is directly controlled by a human in real-time.

SUMMARY AND OBJECTS OF THE INVENTION

It is therefore an object of the present invention to provide a carrier for moving obstacles in the field of automotive safety testing wherein the obstacle is moved along a determined route, with a minimum of contemporaneous human intervention.

This and other objects are attained by providing a carrier for automotive safety testing which can follow a route while controlled by an external guidance system, including GPS, induction and optically based systems. The external guidance system controls the route and the velocity of the carrier which are typically determined before the safety test and controlled in accordance therewith during the safety test.

BRIEF DESCRIPTION OF THE DRAWINGS

Further objects and advantages of the invention will become apparent from the following description and from the accompanying drawings, wherein.

DETAILED DESCRIPTION OF THE PREFERRED EMBODIMENTS

Figure 1:
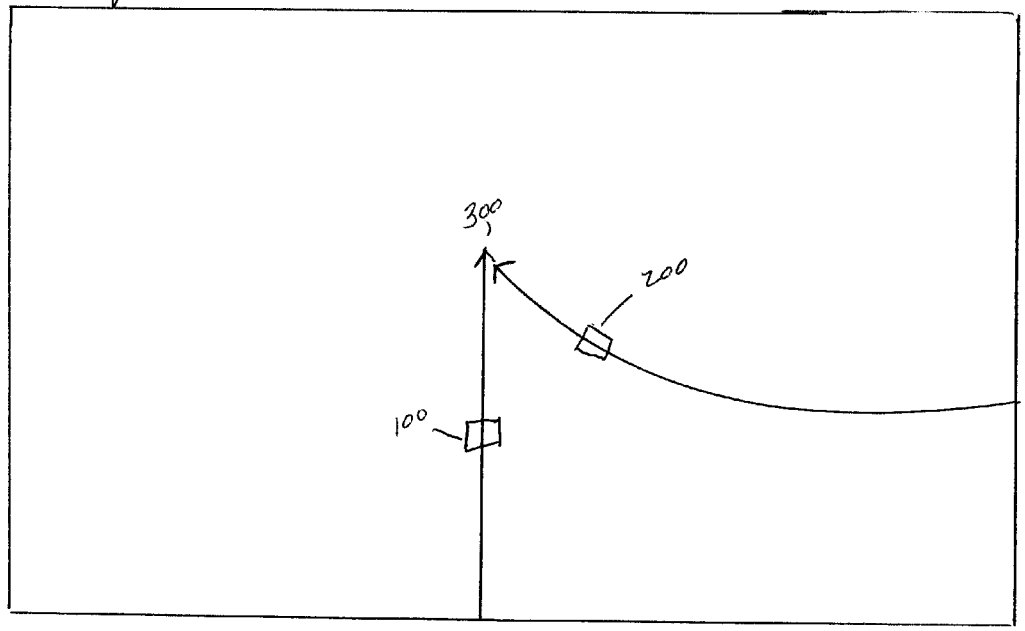
FIG. 1 is a diagram showing the path of the automotive test vehicle and the path of the moving safety test carrier, further showing the possible collision point.

Referring now to the drawings in detail wherein like numerals indicate like elements throughout the several views, one sees that FIG. 1 is a diagram showing, from above, a typical path of an automotive test vehicle 100 as well as a typical path of the moving safety test carrier 200, resulting in a possible collision at point 300.

The path of safety test carrier 200 is determined prior to the safety test. The path data typically includes position and velocity (velocity being a vector, and therefore including direction) as a function of time, typically time after the start of the automotive safety test, or as a function of the position or other characteristic of the automotive test vehicle 100 (thereby defining a form of master/slave relationship).

Figure 2:
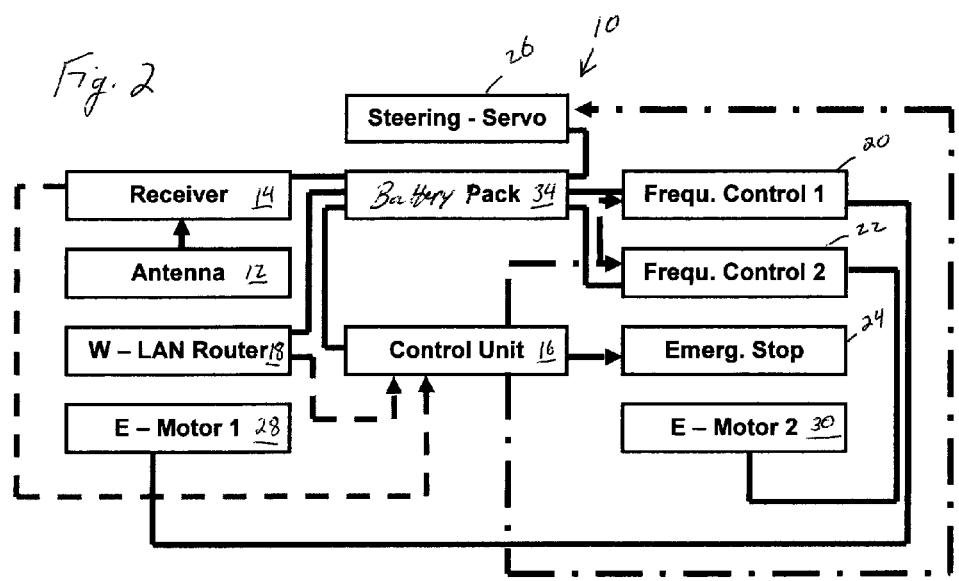
FIG. 2 is a diagram of the electronic configuration of controls of the moving safety test carrier.

In order to implement this configuration, the safety test carrier 200 typically includes circuitry 10 as shown in FIG. 2. Antenna typically receives GPS position information. Additionally or alternatively, antenna 12 can receive determined velocity information (which inherently includes direction) or similar information regarding the desired route of the safety test carrier 200 from a central location (not shown). This information is sent to receiver 14 which converts the information into standard digital format and sends this information in standard digital format to control unit 16. Control unit 16 further typically receives the route and velocity information regarding the desired route of the safety test carrier 200 via a wireless transmitter, typically a W-LAN router 18 from an external personal computer (PC) (not shown). The control unit 16 can compare the GPS-oriented actual position data or similar data from the receiver 14 to desired position data received via a wireless transmitter, typically a W-LAN router 18.

Control unit 16 provides information, commands, or instructions to first and second frequency control blocks 20, 22, as well as emergency stop block 24 and steering servo block 26. First and second frequency control blocks 20, 22 control the speed of respective first and second electric motors 28, 30 (or similar propulsion devices) which drive the safety test carrier 200. As suggested by their respective names, emergency stop block 24 is connected to the braking system or similar system to stop the movement of safety test carrier 200 and steering servo block 26 controls the change of direction of travel of the safety test carrier. All steering and moving commands are forwarded by servos and first and second electric motors 28, 30 to the steering system and the wheels of the safety test carrier 200.

Battery pack 34 provides electrical power to the various components, including the receiver 14, the control unit 16, the wireless transmitter, typically a W-LAN router 18, the first and second frequency control blocks 20, 22 and the emergency stop block 24. Battery pack 34 may further provide electrical power to first and second electric motors 28, 30 or a separate power source may be provided therefor.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A carrier for automotive safety testing, comprising:
   a propulsion device;
   a steering mechanism;
   a first receiving device for receiving data regarding a desired route for the carrier, wherein the desired route is a function of a position of an automotive test vehicle, thereby defining a master/slave relationship;
   a second receiving device, said second receiving device comprising a GPS receiver for receiving data regarding a position of the carrier;
   a control device for receiving data from said first receiving device and determining steering commands and propulsion commands during an automotive safety test, and for transmitting the steering commands to the steering mechanism and propulsion commands to the propulsion device during an automotive safety test.

2. The carrier of claim 1 wherein the first receiving device is a wireless transmitter.

3. The carrier of claim 2 wherein the control device compares actual position data from the second receiving device to desired position data from the first receiving device.

4. The carrier of claim 3 further including a battery pack.

5. The carrier of claim 3 further including an emergency stop block.

6. The carrier of claim 3 wherein the propulsion device includes first and second electric motors.

7. The carrier of claim 2 wherein the wireless transmitter is a Wireless Local Area Network (W-LAN) router.

* * * * *

(12) EX PARTE REEXAMINATION CERTIFICATE (10571st)

United States Patent
Steffan et al.

(10) Number: US 8,655,504 C1
(45) Certificate Issued: Apr. 23, 2015

(54) SAFETY TEST CARRIER CONTROLLED BY EXTERNAL GUIDANCE SYSTEM

(76) Inventors: Hermann Steffan, Linz (AT); Andreas Moser, Linz (AT); Saeed Al-Ghaamdi Ali, Riyadh (SA); Florian Nyvelt, Linz (AT)

Reexamination Request:
No. 90/013,228, May 1, 2014

Reexamination Certificate for:
Patent No.: 8,655,504
Issued: Feb. 18, 2014
Appl. No.: 12/768,964
Filed: Apr. 28, 2010

(51) Int. Cl.
*G01M 17/007* (2006.01)

(52) U.S. Cl.
CPC ................... *G01M 17/0078* (2013.01)

(58) Field of Classification Search
None
See application file for complete search history.

(56) References Cited

To view the complete listing of prior art documents cited during the proceeding for Reexamination Control Number 90/013,228, please refer to the USPTO's public Patent Application Information Retrieval (PAIR) system under the Display References tab.

*Primary Examiner* — Mark Sager

(57) ABSTRACT

The disclosure relates to a carrier for automotive safety testing wherein the movement of the carrier is controlled by an external guidance system, so that the carrier follows a determined route during the automotive safety testing. The actual position of the carrier is typically determined by a GPS system, while the desired position and velocity of the carrier are provided by a wireless transmitter, typically a W-LAN router receiving data from a PC or similar external source.

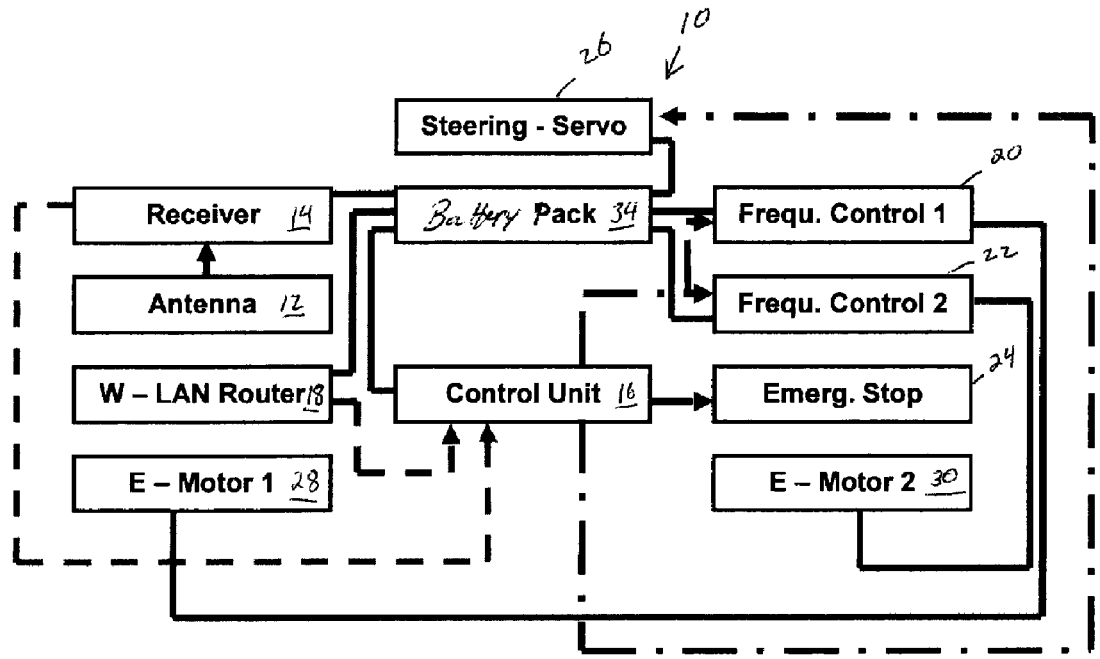

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

\* \* \* \* \*